US006805071B2

(12) United States Patent
Jakubowski, Jr.

(10) Patent No.: US 6,805,071 B2
(45) Date of Patent: Oct. 19, 2004

(54) MAN OVERBOARD LOCATOR DEVICE

(75) Inventor: Thaddeus Jakubowski, Jr., St. Charles, MO (US)

(73) Assignee: The Boeing Company, Chicago, IL (US)

(*) Notice: Subject to any disclaimer, the term of this patent is extended or adjusted under 35 U.S.C. 154(b) by 7 days.

(21) Appl. No.: 10/326,330

(22) Filed: Dec. 20, 2002

(65) Prior Publication Data

US 2004/0123793 A1 Jul. 1, 2004

(51) Int. Cl.$^{7}$ .................................................. B64B 1/50
(52) U.S. Cl. .............. 116/210; 116/DIG. 8; 116/DIG. 9
(58) Field of Search ................................ 116/210, 209, 116/DIG. 8, DIG. 9

(56) References Cited

U.S. PATENT DOCUMENTS 827,350 A * 7/1906 Crofford ...................... 441/89
2,646,019 A * 7/1953 Chetlan ...................... 116/210
3,171,128 A * 2/1965 Shattuck ..................... 343/706
3,253,573 A * 5/1966 Ashline ...................... 116/210
3,381,655 A 5/1968 Rozzelle
3,461,835 A * 8/1969 Cockbill et al. ............ 116/210
3,657,752 A * 4/1972 Davidson et al. ............. 441/31
3,735,723 A * 5/1973 Lutz ........................... 116/210
3,930,448 A * 1/1976 Barber et al. ............... 102/348
3,941,079 A 3/1976 McNeill
4,020,786 A * 5/1977 Kopeika ..................... 116/210
4,114,561 A 9/1978 Asaro
4,185,582 A 1/1980 Bryant
4,586,456 A 5/1986 Forward
4,836,128 A 6/1989 Walker
4,917,041 A 4/1990 Weiswurm et al.
4,944,242 A 7/1990 Russell
5,020,467 A 6/1991 Van Patten et al.
5,049,106 A * 9/1991 Kim et al. .................. 446/220
5,301,631 A 4/1994 Vining
5,421,287 A 6/1995 Yonover
5,520,486 A * 5/1996 Van Wyck .................. 405/186
6,032,607 A * 3/2000 Ashline ...................... 116/210
6,477,979 B1 * 11/2002 Sanchez ..................... 116/210

* cited by examiner

*Primary Examiner*—Christopher W. Fulton
*Assistant Examiner*—R. Alexander Smith
(74) *Attorney, Agent, or Firm*—Thompson Coburn, LLP

(57) ABSTRACT

A device for locating a person has a housing with an interior and an opening into the interior. The device also has a locator balloon stored the housing interior which is deployable from the housing through the housing opening when the device is actuated. The balloon is stored in a nesting arrangement with a portion of the housing with the balloon being collapsed around the housing portion and substantially conforming therewith. The balloon is deployed in a manner such that the balloon passes over the housing portion as the balloon expands out of through the housing opening and inflates with the housing attached to the balloon. The device also has a source of gas that is lighter than air positioned within an interior of balloon. The gas source is released to expand and inflate the balloon when the device is actuated.

17 Claims, 5 Drawing Sheets

MAN OVERBOARD LOCATOR DEVICE

BACKGROUND OF THE INVENTION (1) Field of the Invention

The present invention relates to a device used to locate a person. More specifically, the device utilizes a balloon which is attached to the person with a tether and elevated a distance sufficiently above the person to allow rescuers to more easily determine the location of the person. It is anticipated that the device of the present invention will be especially useful as a means to locate persons who fall overboard at sea as it is intended that the balloon will elevate a distance above the waves and the swell of the seas to allow the balloon to be spotted and the location of the person to be more easily determined through visual means, such as binoculars or the like.

(2) Description of the Related Art

When a person falls overboard at sea, they are often not rescued in time to save their lives because it is often difficult, if not impossible, to find them in the vast expanse of the ocean. Often, the victims become hidden in the waves or the swell of the seas, and even in the best of conditions where the seas are relatively calm, it is often difficult to find a person who has fallen overboard given all of the variables present in the situation, including, current, wind, flotsam, the precision of tracking the course of the vessel from which the person has fallen, the estimate of the time when the person fell overboard, the rescuers line of sight and visible horizon, etc.

In order to overcome these inherent problems, a locator device with an inflatable balloon has been used to assist rescuers in determining the exact location of an overboard person. Generally, these devices include a locator balloon which is inflated from a gas cylinder and a tether which connects the balloon to the person. When the balloon is inflated, it elevates above the person and remains visible above the person even in the swells of the seas thereby providing rescuers with a means to more readily locate the person.

These devices have proven effective but their construction often does not allow for their rapid deployment in an emergency situation. Oftentimes persons find themselves in an overboard situation unexpectedly and they are often startled and disoriented when they first enter the water and as they struggle to maintain flotation. Very often, the person must use his or her arms and legs to swim or tread water as they grasp for life preservers or rafts, and many times these types of personal flotation devices require actuation or inflation before they can be used. Obviously, this is an immediate concern for the person when they find themselves in the water, and usually it is only after the person has managed to stabilize his or her condition that the person begins to think about their rescue and letting their location be known to rescuers.

With these concerns in mind, emergency locator devices must satisfy several criteria in order to be effective. First, it is necessary that the locator device be easily actuated by the person once they are in the water. The locator device must be easily and readily deployable with relatively few movements and operations so that actuation of the locator device does not distract the person from the primary tasks at hand, i.e., to main flotation and tend to any injuries they may have.

Further, it is essential that the locator device be small and portable so that it may be easily carried and worn by the victim. Preferably, the device is sized to allow the person to wear the device comfortably and non-obtrusively whenever they are embarked on a vessel. A small and compact device is more apt to be worn by the person when they embark on a vessel thereby promoting boating safety. Also, it is necessary that the locator device be self-storing such that it is protected from the elements and inadvertent contact with objects which might otherwise damage the device or interfere with its proper operation. At the same time, it is essential that the device have a modular construction to allow it to be easily assembled, maintained, repaired, reused, and manufactured in a cost effective manner. Additionally, it is essential that the device have few moving parts and be of relatively simple construction so as to enhance its dependability and reliability, especially in the adverse conditions commonly found at sea.

SUMMARY OF THE INVENTION

The locator device of the present invention meets these requirements and provides a small compact design for a locator device which may be worn on the belt or belt loop of a person. In this way, the person's arms and hands are free to conduct other tasks that may be needed once the person finds themselves in the overboard situation. Because the locator device attaches to the person, the person need not hold the locator device in their hands nor worry that in the event they become fatigued that they may let go of the device. The locator device of the present invention is easily deployable in the event a person finds themselves in an overboard situation and requires few operations in order to actuate the device, thereby allowing the person to actuate the locator device even if they are disoriented and are working to activate or assemble other rescue or survival equipment. In fact, the device of the present invention may be actuated by one hand in two simple motions. Additionally, the locator device of the present invention has a relatively simple, modular construction with few moving parts that is reliable and may be cost-effectively manufactured.

Among the aspects of the present invention is the provision of a device for locating a person comprising a housing having an interior with an opening into the interior. The device has a locator balloon stored in the housing interior which is deployable from the housing through the housing opening when the device is actuated. The device also comprises a source of gas that is lighter than air positioned within an interior of balloon. The gas is released from the gas source to expand and inflate the balloon when the device is actuated.

The balloon may be stored in a nesting arrangement with a portion of the housing with the balloon being collapsed around the housing portion and substantially conforming therewith. The balloon may also be deployed from the housing in a manner such that the balloon passes over the housing portion as the balloon expands out through the housing opening and inflates with the housing attached to the balloon.

Among another aspect of the present invention is a device for locating a person where the device has a housing with an interior and an opening into the interior and a source of gas that is lighter than air positioned within the housing interior. The balloon is stored in the housing interior with an interior of the balloon receiving a first part of the housing and the gas source therein with a second part of the housing surrounding the balloon. The balloon is deployed from the housing when the gas is released from the gas source in a manner such that the balloon expands from the housing opening and inflates with the housing attached to the balloon and the housing second part surrounding at least a portion of the balloon.

The housing portion may comprise an inner sleeve such as a mandrel with a hollow interior dimensioned to be received in the housing interior. The gas source may comprise a gas cylinder containing a pressurized gas sized to be received within the mandrel interior. The balloon may have an interior with an end configured to fit over the mandrel in a manner such that the balloon interior receives a portion of the mandrel and the gas cylinder thereby placing the balloon interior in fluid communication with the gas cylinder when the device is actuated. The balloon may have a shape which allows the balloon to be stored in the housing hollow interior and to expand out of the housing opening as the balloon is inflated when the device is actuated.

The device may comprise a trigger which is attachable to the housing and operable from a position is exterior to the housing. The trigger may also have a pointed end positionable to extend into the mandrel interior adjacent the gas cylinder. The trigger pointed end may be adapted to puncture a rupture disk on the gas cylinder to permit the gas to be discharged from the cylinder to fill the balloon interior when the device is actuated.

The device may also comprise an end cap which is removably attachable to the housing at the opening. The end cap is preferably separable from the housing when the device is actuated and may be connected to the housing with a tether. The end cap may also have a latch adapted to be removably attached to the person to allow the device to be worn.

The present invention provides for a compact design for a man overboard locator device which is lightweight and easily worn by a person. Further objects and features of the invention are revealed in the following detailed description of the preferred embodiment of the invention and in the drawings which follow.

BRIEF DESCRIPTION OF THE DRAWINGS

Corresponding reference numbers indicate corresponding parts throughout the several views of the drawings.

DETAILED DESCRIPTION OF THE PREFERRED EMBODIMENT

Figure 1:
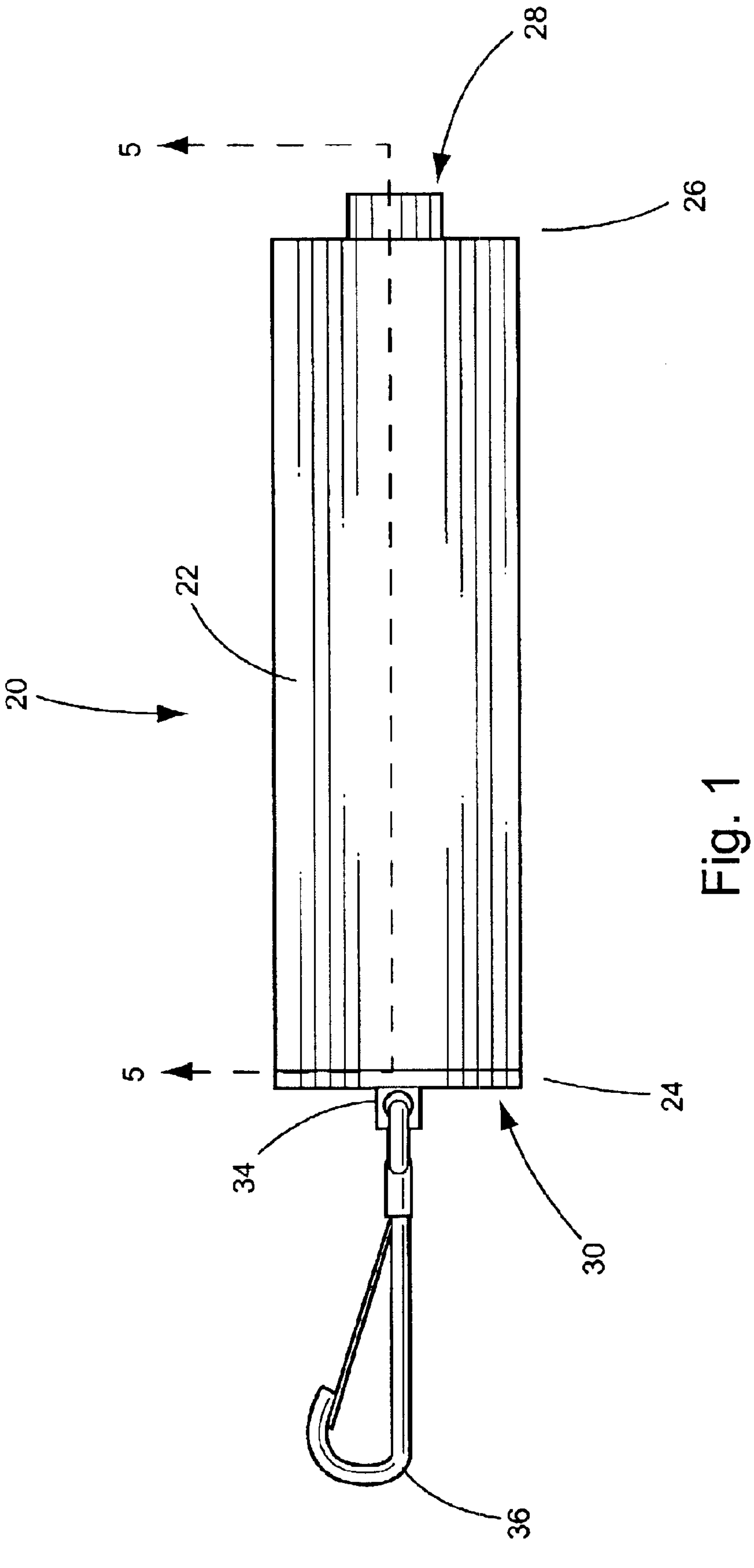
FIG. 1 shows a locator device of the present invention.

FIG. 1 shows a locator device 20 of the present invention fully assembled. Preferably, the locator device 20 has a housing 22 with a hollow cylindrical shape defining an interior 23 for the housing and axially opposite first and second ends 24,26 with a trigger 28 positioned exterior of the housing at one end 24 and an end cap 30 removably attachable to the housing 20 at the other opposite end 26. It is intended that the housing cylinder 22 have the size of a miniature flashlight so that the locator device may be easily and non-obtrusively worn by a person. Preferably, the housing cylinder 22 is made from a lightweight plastic which may be easily injection-molded and cost effectively manufactured. The lightweight plastic allows the housing to be elevated with a locator balloon, as will be described. However, the plastic material must be sufficiently strong to withstand the elements while providing protection for the balloon and the other components stored within the housing, as will become apparent from the description below.

Figure 2:
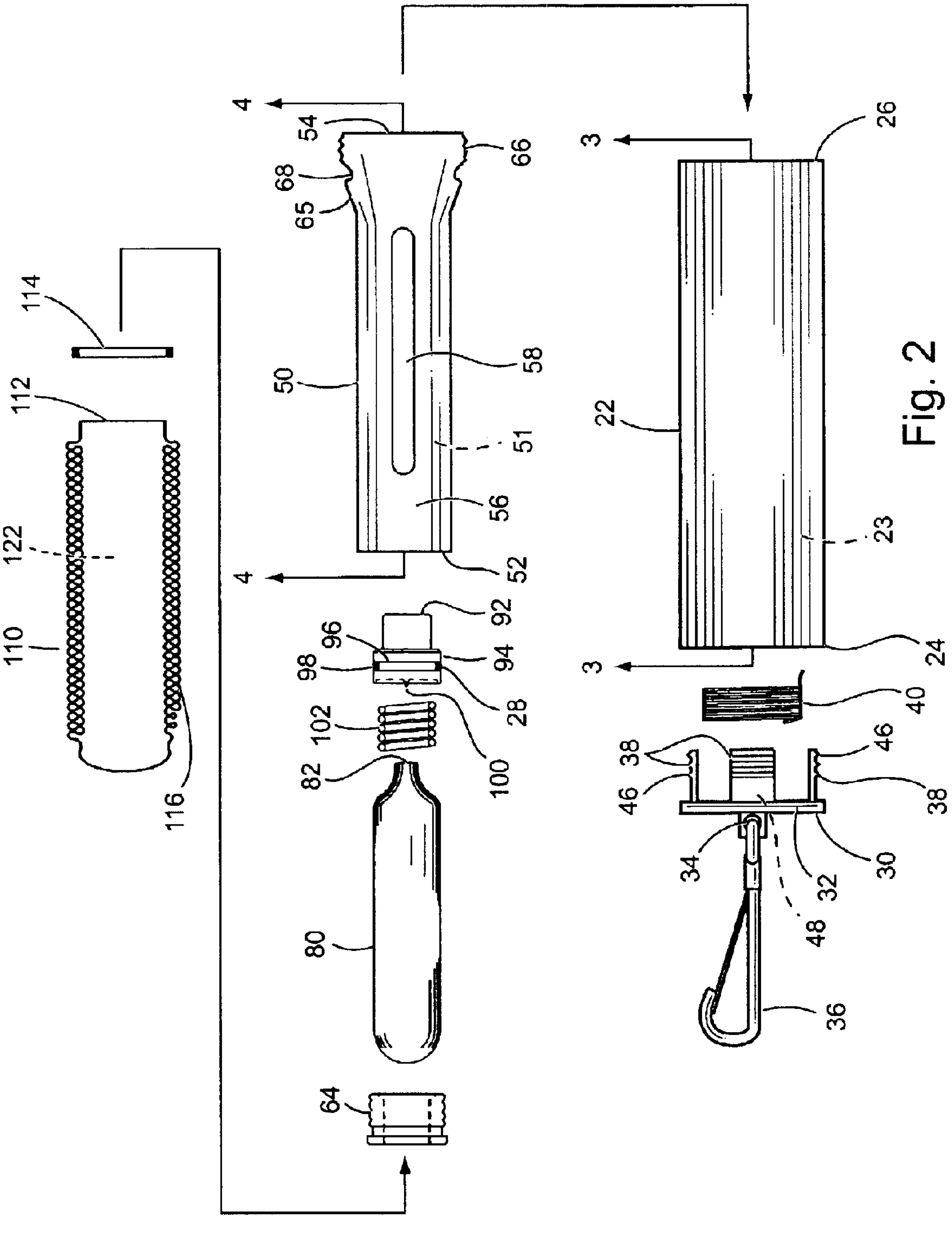
FIG. 2 shows an exploded view of the locator device of FIG. 1 comprising a housing, end cap, mandrel, locator balloon, mandrel end cap, and trigger assembly of the present invention.
Figure 3:
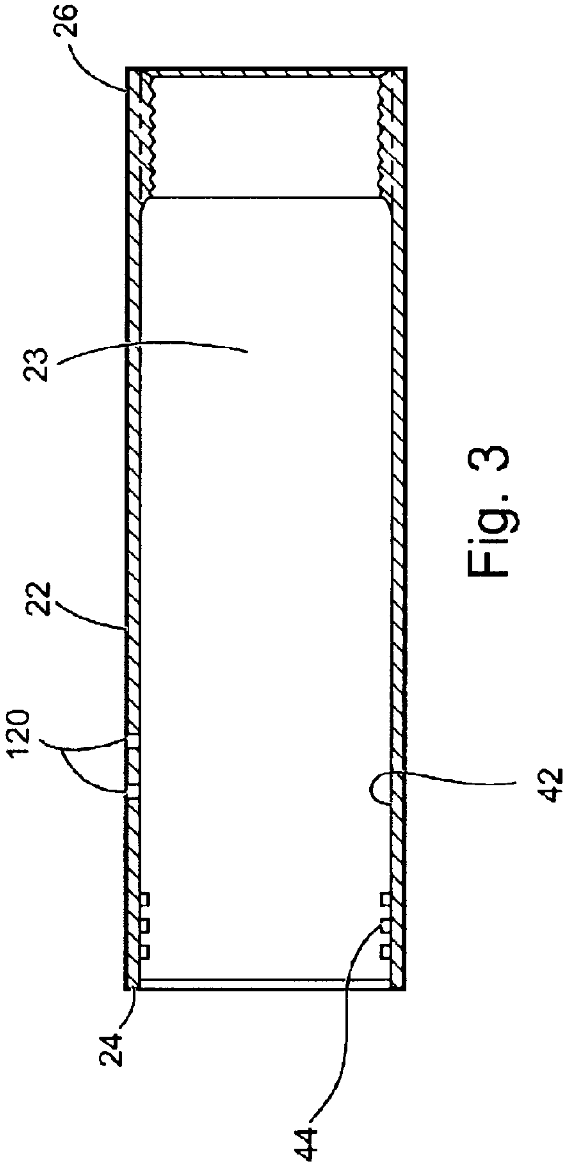
FIG. 3 shows a cross-sectional view of the housing of FIG. 2.

FIG. 2 shows an exploded view of several of the components of the locator device 20 and illustrates the manner in which the components are arranged to assemble the locator device. The end cap 30 has a round disk portion 32 which is dimensioned to fit over and enclose a portion of the hollow interior of the housing. The end cap disk portion 32 has an eye 34 on its outer surface which receives a snap latch 36 that allows the locator device to be worn by the person by removably attaching the snap latch to a person's belt or pants belt loop. On an inner surface of the disk portion 32, spring-loaded fingers 38 are provided which extend axially away from the disk portion. Preferably, the fingers and the disk inner surface are arranged in a manner to allow a tether 40 to be coiled in a compact fashion within the fingers against the disk inner surface. The spring-loaded fingers 38 extend from the disk inner surface and are biased to engage with an inner surface 42 of the housing when the end cap is removably attached to the housing. Preferably, an inner surface 42 of the housing at the housing first end 24 is formed with a plurality of serrations or annular ribs 44 (FIG. 3), and the end cap fingers 38 are formed with a plurality of grooves 46 that match and engage with the serrations on the housing inner surface. This allows the end cap 30 to be press fit into the housing interior 23 in a manner such that with modest force, the end cap may be pulled away and separated from the housing 22. An eye 48 is formed on the disk portion inner surface to receive an end of the tether 40, as will be explained below. Preferably, the end cap 30 is also made from a suitable plastic material which provides sufficient resiliency for the end cap fingers 38 such that the fingers may be urged against the housing inner surface 42 when the end cap is removably attached to the housing.

Figure 4:
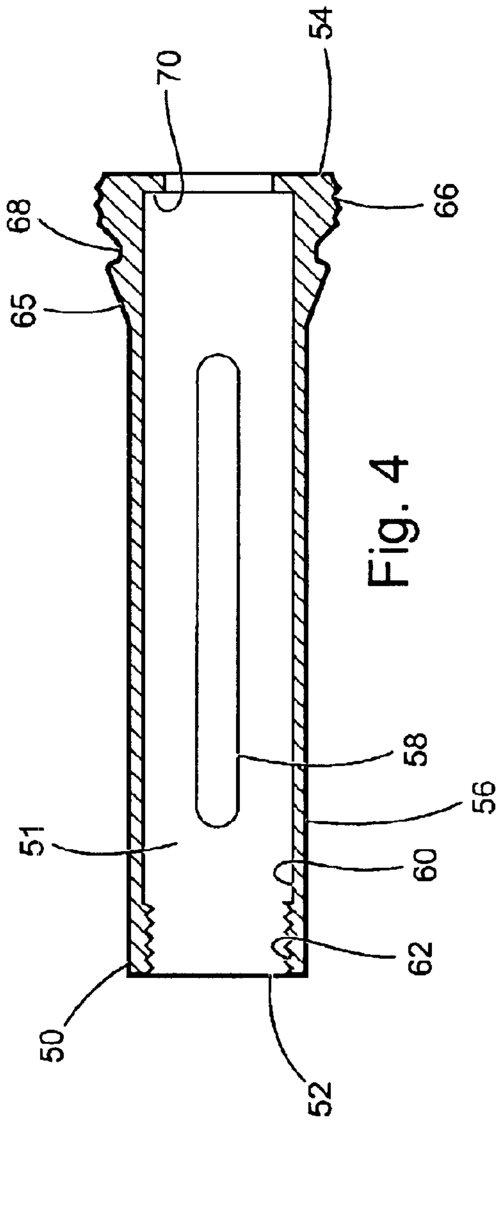
FIG. 4 shows a cross-sectional view of the mandrel of FIG. 2.

FIG. 2 shows an inner sleeve of the housing or a mandrel 50 in position to be received within the housing hollow interior 23. The mandrel 50 is a generally cylindrically-shaped tube defining a mandrel hollow interior 51 with axially opposite first and second ends 52,54. The mandrel has an outer surface 56 and a plurality of apertures 58 through its outer surface that communicate with the hollow interior of the mandrel. As shown in FIG. 4, the apertures 58 are slots that extend axially through the mandrel outer surface. At the mandrel first end 52, an inner surface 60 of the mandrel is provided with threads 62 so that a mandrel cap 64 or plug may be screwed into the mandrel 50 to enclose the mandrel first end. The mandrel outer surface at the second end 54 is formed with a taper 65 and threads 66 (FIG. 3) to allow the mandrel 50 to be screwed into the housing interior at the housing second end 26. The mandrel outer surface at the second end 54 also has a groove 68 to allow a balloon to be securely attached to the mandrel, as will be described in greater detail below. In the mandrel interior 51, the mandrel second end 54 has an annular rim 70 which extends radially inward to define an opening at the mandrel second end. When the mandrel 50 is screwed into the housing interior 23, the annular rim 70 forms a portion of the exterior of the locator device. Preferably, the mandrel is made from a plastic material which is light weight and compatible with the material of the housing.

FIG. 2 also shows a gas cylinder 80 used in the locator device in a position to be received within the mandrel hollow interior 51. The gas cylinder 80 contains a gas which is lighter than air, such as helium, and is sized such that it may be received within the mandrel hollow interior. The gas canister is similar to those gas canisters commonly used for air rifles or pellet guns, and the contents of the canister are sealed under pressure with a rupture disk 82 formed on a distal end of the canister.

FIG. 2 also shows the trigger 28 for actuating the locator device 20 which is arranged exterior to the housing so that it is readily accessible when the locator device is actuated. The trigger 28 is of relatively simple construction and includes a button or actuation plunger 92 which is movable in an axial direction within a bushing 94 of the trigger. When the locator device 20 is assembled, the trigger 28 is supported on the mandrel annular rim 70 such that the trigger button or actuation plunger 92 projects beyond the housing 22 and the mandrel annular rim. The bushing 94 contains a groove 96 which holds a seal 98 that engages the mandrel inner surface 60 to form a leak-tight boundary for the mandrel interior 51. The actuation plunger 92 also has a sealing fit with the bushing 94 to prevent leakage between the two and a leak-tight boundary for the mandrel interior 51.

The trigger 28 comprises a pointed end 100 opposite the actuation plunger or button 92 which extends into the mandrel hollow interior 51 in a position where the pointed end 100 may puncture the rupture disk 82 on the gas cylinder when the button is depressed in the direction of the gas cylinder. To avoid inadvertent puncturing of the gas cylinder rupture disk 82, a spring 102 is installed between the gas cylinder 80 and the trigger 28 such that an appropriate force must be used on the button 92 to compress the spring and puncture the rupture disk. As shown in the FIGS. 2 and 5, the gas cylinder 80 is captured and held in position in the mandrel hollow interior 51 between the compression spring 102 and the mandrel cap or plug 64.

FIG. 2 also shows a locator balloon 110 of the present invention in a deflated state in a position to be assembled with the mandrel 50. The locator balloon 110 has a shape which closely conforms to the mandrel when it is deflated and an end 112 which is adapted to slide over the mandrel first end 52 and be expanded over the mandrel taper 65 at the mandrel second end 54 such that a portion of the balloon end is positioned to overlie the mandrel groove 68. The remainder of the balloon may be accordion folded over the mandrel outer surface in a manner such that the balloon closely conforms to the mandrel. A tie 114 is used to secure the balloon 110 to the mandrel 50 by tightening the tie over the balloon end portion in the mandrel groove 68. Preferably, the mandrel 50 has a portion with an outer diameter dimension which is less than the inner diameter of the housing inner surface. This difference in size creates an annular space between the housing inner surface 42 and the mandrel outer surface 56 when the mandrel 50 is screwed into the housing interior 23 such that the balloon may be easily stored in the annular space with its accordion folds 116.

Figure 5:
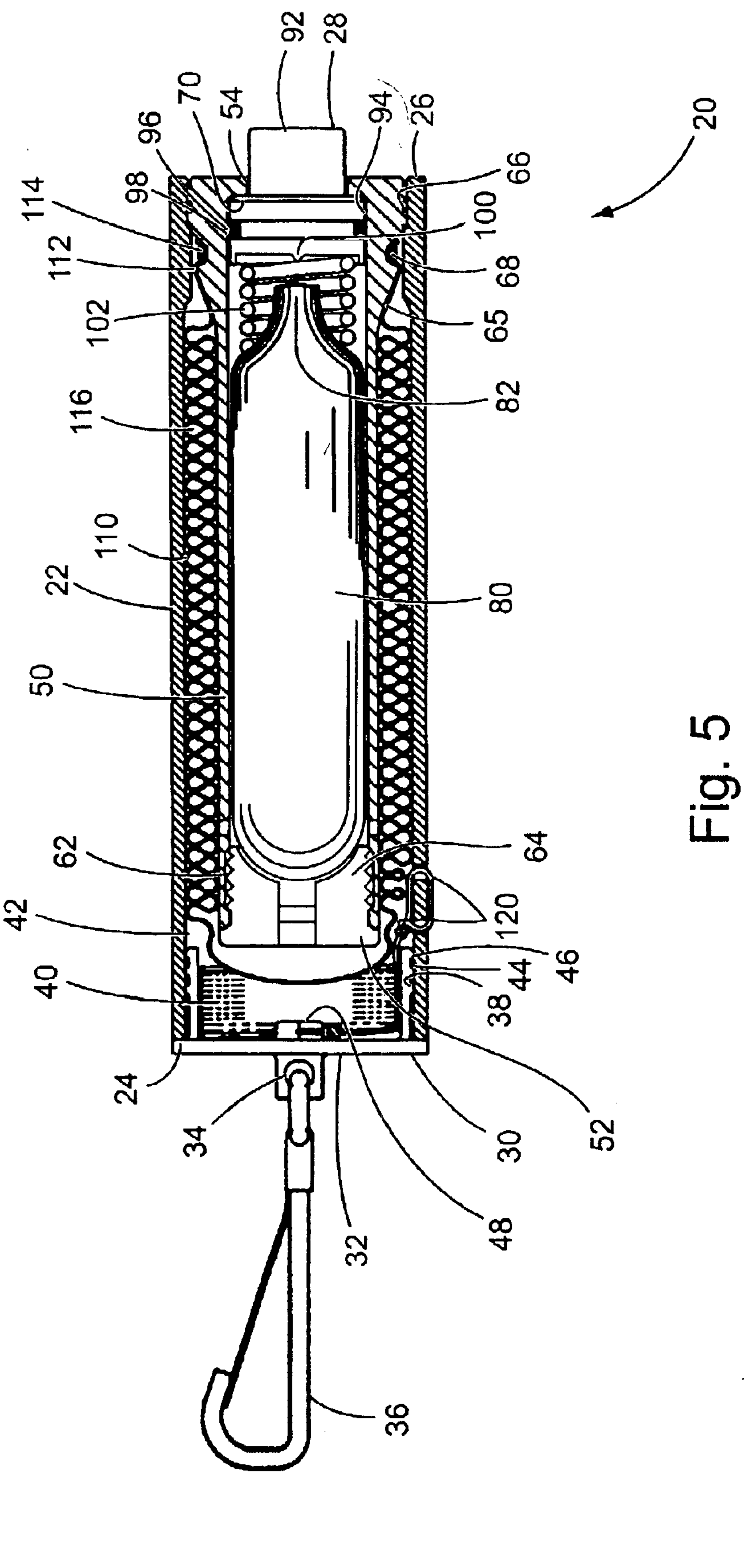
FIG. 5 shows a cross-sectional view of the locator device taken along line 5—5 of FIG. 1 where the locator device is fully assembled and the parts of the locator device described above with respect to FIG. 2 are shown.

As shown in FIGS. 2 and 5, the tether 40 is preferably connected between the housing 22 and the end cap 30. Two holes 120 are provided in the housing 22 just below the end cap serrations on the housing first end and an end of the tether is directed through the holes and tied. The other end of the tether is tied directed through the eye 48 on the end cap disk inner surface and tied.

In order to describe the cooperative relationship of the various elements of the locator device 20, the assembly of the locator device will be described with reference to FIGS. 2 and 5. First, with the mandrel cap 64 or plug removed from the mandrel first end 52, the trigger 28 is received in the mandrel hollow interior by directing the trigger through the mandrel first end and sliding it towards the mandrel second end 54 until the trigger bushing rests upon the mandrel annular rim 70. The trigger bushing seal 98 sealingly engages the mandrel interior 51 at the second end thereby forming a leaktight boundary therewith. In this position, the trigger actuation button 92 is arranged exterior to the housing as it extends through the opening at the mandrel second end 54.

Next, the compression spring 102 is received in the mandrel hollow interior by directing the compression spring through the mandrel first end 52 and moving it through the mandrel hollow interior 51 until the spring rests upon the trigger 28. The gas cylinder 80 is then directed through the mandrel first end 52 and moved through the mandrel hollow interior until the gas cylinder distal end is positioned inside the coil of the compression spring 102 where the trigger pointed end 100 is positioned to puncture the gas cylinder rupture disk 82 when the device is actuated. To secure the gas cylinder 80 in place within the mandrel hollow interior 51, the mandrel cap or plug 64 is screwed into the mandrel interior at the mandrel first end with the threads 62 such that the gas cylinder is captured between the mandrel cap and the compression spring. The compression spring may be slightly depressed from axial movement of the gas cylinder when mandrel cap is screwed in place in the mandrel first end.

Next, the balloon 110 is secured to the mandrel 50 by inserting the mandrel (assembled with the gas cylinder 80, trigger 28, compression spring 102 and mandrel end cap 64) through the balloon end 112 and into an interior of the balloon 122. The balloon end 112 is slid over the mandrel outer surface towards the mandrel second end 54 and expanded over the mandrel taper 65 until the balloon end portion is positioned to overlie the mandrel groove 68. Thereafter, the tie 114 is tightened around the balloon end portion in the mandrel groove 68 to secure the balloon to the mandrel. The remainder of the balloon is slid over the portion of the mandrel inside the balloon and accordion folded neatly about the mandrel.

Next, the tether 40 is tied between the end cap 30 at the eye 48 and the housing 20 at the housing tether holes 120 and coiled between the end cap fingers 38. The mandrel 50 (assembled with the balloon 110, gas cylinder 80, trigger 28, compression spring 102 and mandrel cap 64) is then inserted into the housing interior 23 at the housing second end 26 and screwed in place with the threads 66, and the end cap 30 is press fit into the housing interior at the housing first end 24.

Figure 6:
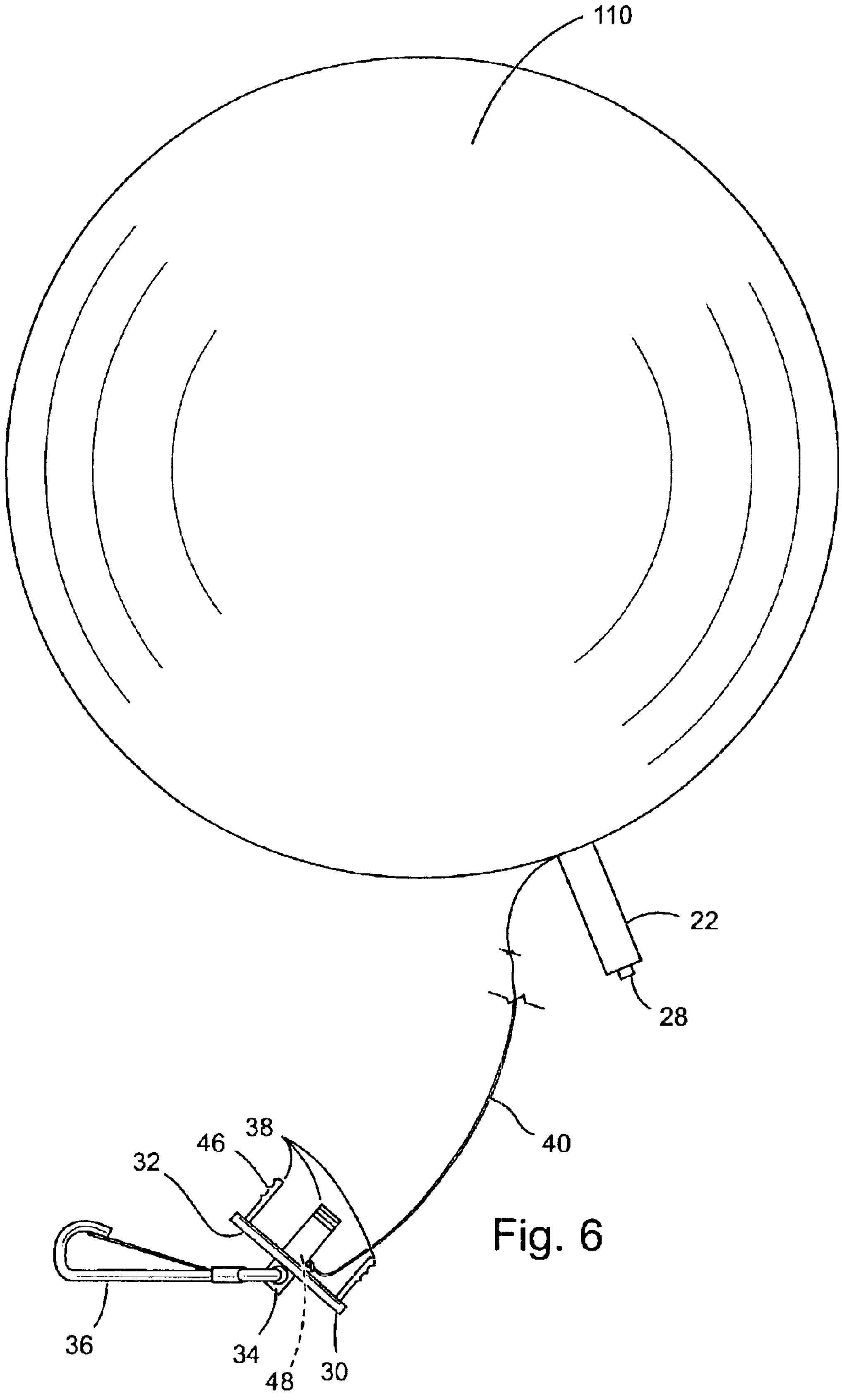
FIG. 6 shows the locator device actuated with the locator balloon being elevated above the end cap.

The device may be clipped to a person's belt using the snap latch 36 provided on the end cap 30. When the device is ready to be deployed, the person grasps the housing 22 and pulls it away from his or herself such that the housing 22 and the end cap 30 are separated with the end cap snap latch 36 attached to the person. The person then depresses the actuation plunger 92, for instance, with his or her thumb, thereby driving the trigger pointed end 100 inwardly against the force of the compression spring 102 toward the gas cylinder 80 where the pointed end punctures the rupture disk 82. Gas then is discharged from the gas cylinder 80 and fills the mandrel hollow interior 51. With the seal formed between the trigger bushing and the mandrel second end and between the actuation plunger and the trigger bushing, the gas from the cylinder flows from the mandrel hollow interior through the mandrel apertures 58 into the balloon interior 122. The balloon interior fills and expands forcing the balloon out through the housing first end 24, as shown in FIG. 6. The balloon continues to expand and inflate such that the balloon elevates above the person carrying with it the housing, and the mandrel (assembled with the gas cylinder, trigger, compression spring, and mandrel cap) in the balloon interior. The tether is sufficiently long to allow the balloon to reach an elevation above the person sufficient to enable rescuers to determine the location of the person.

As can be seen from the above description, the locator device provides a simple and easy to use device which can be deployed by the person in two simple motions, i.e. pulling the housing away from the person and depressing the actuation plunger. The device is modular so that it may be easily manufactured, repaired and maintained. After the device is used, it may be reused by disassembling it and refitting it with a new gas cylinder and/or balloon if necessary. In the arrangement described herein, the balloon is held within the housing until the device is actuated thereby preventing damage to the balloon during storage and when the device is worn. Also, the arrangement of housing around the mandrel protects the integrity of the connection between the balloon and the mandrel when the device is actuated and the balloon is inflated thereby enhancing the device's reliability and dependability. By arranging the mandrel and gas cylinder within the interior of the balloon the overall size of the locator device may be reduced thereby allowing it to worn by the person in an unobtrusive fashion, and the snap latch provides a convenient means of attaching the device to the person.

As described herein the end cap is press fit into the housing by providing resilient fingers on the end cap. It should be appreciated that these elements may be reversed or other means to removably attach the end cap to the housing could be provided. Also, as described herein the grooves and serrations are provided on the end cap fingers and housing inner surface, respectively, to provide a means for removably attaching the end cap to the housing. It should be appreciated that these elements may be reversed or other means may be used to provide positive engagement between the end cap and the housing when the end cap is removably attached to the housing. As described herein, the tether is connected between an eye of the end cap and holes provided on the housing. It should be appreciated that the tether may be connected to other locations in order to connect the first and second parts of the locator device together.

As described herein, the mandrel is removably attached to the housing through a threaded connection. It should be appreciated that the mandrel may be connected to the housing by other means including a press fit connection or through a system of complementing clips and notches which provide a releasable or removable attachment. Similarly, the mandrel end cap may also be removably attached to the mandrel through like means. As shown and described herein the mandrel is a separate piece apart from the housing. It should be appreciated that the housing and mandrel may be formed integrally or monolithically such that the housing comprises an inner sleeve and an outer sleeve with the inner sleeve preferably having the general shape of the mandrel.

As described herein, the housing has a cylindrical configuration with the end cap on one end and the trigger on the other. It should be appreciated that the locator device may have alternate configurations and the trigger and end cap may be placed in other locations relative to the exterior of the locator device and housing without detracting from the mode of operation of the device.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A device for locating a person comprising:

a housing comprising an outer sleeve and an inner sleeve positioned within the outer sleeve with a space therebetween, the housing having an interior with an opening into the interior;

a locator balloon stored in the housing interior in the space between the inner and outer sleeves the balloon being deployable from the housing through the housing opening when the device is actuated; and a source of gas that is lighter than air positioned within the housing interior, the gas being released from the gas source to expand and inflate the balloon when the device is actuated;

wherein the gas source remains within an interior of the balloon when the balloon is inflated.

2. The device of claim 1 wherein the gas flows from the gas source through the inner sleeve to the interior of the balloon when the device is actuated.

3. The device of claim 1 further comprising a trigger operable from a position exterior to the housing, the trigger being adapted to release the gas from the gas source when the device is actuated.

4. The device of claim 3 wherein the housing is generally cylindrically shaped with axially opposite ends, the balloon expands out of the housing at the opening at one of the axial ends when the device is actuated, and the trigger is arranged exterior to the housing at the opposite end.

5. The device of claim 1 wherein the gas source comprises a gas cylinder.

6. The device of claim 1 further comprising a tether stored in the housing to extend between the person and the housing when the device is actuated.

7. A device for locating a person comprising:

a housing having an interior with an opening into the interior;

a locator balloon stored in the housing interior in a nesting arrangement with an inner sleeve formed in the housing interior, the inner sleeve being positioned within an interior of the balloon with the balloon being collapsed around the inner sleeve and substantially conforming therewith, the balloon being deployable from the housing in a manner such that the balloon passes over the inner sleeve as the balloon expands out through the housing opening and inflates with the housing attached to the balloon; and a source of gas that is lighter than air positioned within the inner sleeve, the gas being released from the gas source to expand and inflate the balloon when the device is actuated; and further comprising an end cap removably attachable to the housing at the opening, the end cap being separable from the housing when the device is actuated, the end cap being attached to the housing with a tether.

8. The device of claim 7 wherein the balloon is accordion folded around the inner sleeve.

9. The device of claim 7 wherein the end cap has a latch adapted to be removably attached to the person to allow the device to be worn by the person.

10. The device of claim 7 wherein the end cap has a plurality of fingers which extend outward from the end cap and are biased to engage with the housing interior when the end cap is removably attached to the housing.

11. The device of claim 10 wherein the end cap and fingers are shaped to receive the tether coiled within the fingers.

12. The device of claim 7 wherein the balloon expands out of the opening when the end cap is removed from the opening and the device is actuated.

13. A device for locating a person comprising:

a housing having an interior and first and second parts formed in the housing interior, the housing second part surrounding the first part with a space between the first and second parts, the housing having an opening into the housing interior;

a source of gas that is lighter than air positioned within the housing interior;

a locator balloon stored in the housing interior in the space between the first and second parts, an interior of the balloon receiving the first part of the housing and the gas source therein with the second part of the housing surrounding the balloon, the balloon being deployed from the housing when the gas is released from the gas source in a manner such that the balloon expands and inflates with the housing attached to the balloon and the housing second part surrounding at least a portion of the balloon;

wherein the housing second part comprises an outer sleeve and the housing first part comprises an inner sleeve disposed within the outer sleeve with the space being annular and between the two sleeves and the balloon is received in the annular space when the balloon is stored in the housing interior.

14. The device of claim 13 wherein the inner sleeve has a groove on its outer surface and an end of the balloon overlies the inner sleeve groove, and a tie is tightened around the balloon end in the groove thereby securing the balloon to the housing.

15. The device of claim 13 wherein the balloon is collapsed around and substantially conforms with the inner sleeve when the balloon is stored in the housing interior.

16. The device of claim 13 further comprising a trigger operable from a position exterior to the housing, the trigger being adapted to release the gas from the gas source when the device is actuated.

17. A device for locating a person comprising:

a housing having an interior and first and second parts formed in the housing interior, the housing second part surrounding the first part with a space between the first and second parts, the housing having an opening into the housing interior;

a source of gas that is lighter than air positioned within the housing interior;

a locator balloon stored in the housing interior with an interior of the balloon receiving the first part of the housing and the gas source therein with the second part of the housing surrounding the balloon, the balloon being deployed from the housing when the gas is released from the gas source in a manner such that the balloon expands and inflates with the housing attached to the balloon and the housing second part surrounding at least a portion of the balloon; and further comprising a trigger operable from a position exterior to the housing, the trigger being adapted to release the gas from the gas source when the device is actuated;

wherein the housing is generally cylindrically shaped with axially opposite ends, the balloon expands out of the housing at the opening at one of the axial ends when the device is actuated, and the trigger is arranged exterior to the housing at the opposite end.

* * * * *